(12) United States Patent
Lin

(10) Patent No.: US 7,955,404 B2
(45) Date of Patent: Jun. 7, 2011

(54) DUST COLLECTOR

(76) Inventor: Tony Lin, Taichung (TW)

( * ) Notice: Subject to any disclaimer, the term of this patent is extended or adjusted under 35 U.S.C. 154(b) by 0 days.

(21) Appl. No.: 12/608,942

(22) Filed: Oct. 29, 2009

(65) Prior Publication Data

US 2011/0100225 A1 May 5, 2011

(51) Int. Cl.
*B01D 50/00* (2006.01)
(52) U.S. Cl. ............... 55/337; 55/305; 55/320; 55/323; 55/324; 55/361; 55/413; 55/416; 55/418; 55/467; 55/472; 55/473; 55/424; 55/426; 55/514
(58) Field of Classification Search .............. 55/305, 55/320, 323–324, 337, 361, 413, 416, 418, 55/467, 472–473, 424, 426, 514
See application file for complete search history.

(56) References Cited

U.S. PATENT DOCUMENTS

| | | | | |
|---|---|---|---|---|
| 2,413,499 A * | 12/1946 | Hulton | | 55/303 |
| 2,483,690 A * | 10/1949 | Carlson | | 55/300 |
| 2,824,335 A * | 2/1958 | Moffat | | 15/345 |
| 3,343,199 A * | 9/1967 | Nolte | | 15/319 |
| 4,276,701 A * | 7/1981 | Takacs et al. | | 34/109 |
| 4,529,423 A * | 7/1985 | Johnson | | 96/421 |
| 4,581,050 A * | 4/1986 | Krantz | | 55/315.2 |
| 4,715,872 A * | 12/1987 | Snyder | | 55/315 |
| 4,917,712 A * | 4/1990 | Crigler | | 95/280 |
| 4,993,107 A * | 2/1991 | Zoni | | 15/352 |
| 5,013,333 A * | 5/1991 | Beaufoy et al. | | 95/20 |
| 5,066,315 A * | 11/1991 | Haberl et al. | | 95/271 |
| 5,096,472 A * | 3/1992 | Perry | | 95/278 |
| 5,141,309 A * | 8/1992 | Worwag | | 356/72 |
| 5,163,985 A * | 11/1992 | Chen | | 55/356 |
| 5,169,420 A * | 12/1992 | Chen | | 55/315 |
| 5,259,854 A * | 11/1993 | Newman | | 55/320 |
| 5,439,513 A * | 8/1995 | Periasamy et al. | | 96/25 |
| 5,762,684 A * | 6/1998 | Hayashi et al. | | 95/24 |
| 5,800,579 A * | 9/1998 | Billingsley et al. | | 55/337 |
| 6,083,291 A * | 7/2000 | Okada et al. | | 55/337 |
| 6,221,135 B1* | 4/2001 | Wirth et al. | | 95/273 |
| 6,507,974 B1* | 1/2003 | Cheng | | 15/347 |
| 6,797,046 B2* | 9/2004 | Wang | | 96/421 |
| 6,875,248 B1* | 4/2005 | Shelton et al. | | 55/356 |
| 7,044,991 B2* | 5/2006 | Wang | | 55/366 |
| 7,186,281 B2* | 3/2007 | Cheng | | 55/289 |
| 7,217,307 B2* | 5/2007 | Cheng | | 55/356 |
| 7,260,868 B2* | 8/2007 | Cheng | | 15/347 |
| 7,695,537 B2* | 4/2010 | Cheng | | 55/467 |
| 7,695,538 B2* | 4/2010 | Cheng | | 55/467 |
| 2005/0076624 A1* | 4/2005 | Cho | | 55/356 |
| 2005/0126136 A1* | 6/2005 | Cheng | | 55/341.2 |
| 2005/0126397 A1* | 6/2005 | Rosenzweig | | 96/421 |

* cited by examiner

*Primary Examiner* — Jason M Greene
*Assistant Examiner* — Dung Bui

(57) ABSTRACT

A dust collector includes a shell, an exit tube, an inner tube, a suction device, a first dust container, a bypass tube and a first dust bag. The shell defines a first receiving room therein. The exit tube defines an exit passage therein. The inner tube defines a connection passage which has a first opening and a second opening. The first opening communicates the first receiving room, and the second opening communicates the exit passage. The suction device provides the exit passage with a negative pressure. The first dust container defines a second receiving room therein. A mesh is disposed on a bottom surface of the first dust container to divide the second receiving room into a first chamber and a second chamber. The bypass tube defines a bypass passage therein, and it communicates the connection passage with the second chamber. The first dust bag is disposed in the first chamber.

5 Claims, 5 Drawing Sheets

DUST COLLECTOR

BACKGROUND OF THE INVENTION

1. Field of the Invention

The present invention relates to a dust collector.

2. Description of the Prior Art

The dust collector is mainly used to clean the air. More specifically, the dust collector includes a suction device to draw air into the dust collector, and the suspension dust of the air will precipitate in the dust collector. A dust bag is further provided to receive the condensed dust therein.

SUMMARY OF THE INVENTION

The main object of the present invention is to provide a dust collector that its dust bag can be efficiently expanded.

To achieve the above and other objects, a dust collector of the present invention includes a shell, an exit tube, an inner tube, a suction device, a first dust container, a bypass tube and a first dust bag. The shell defines a first receiving room therein, and it has an entrance hole communicating the first receiving room. The exit tube defines an exit passage therein. The inner tube extends from an inner periphery of the shell toward the first receiving room. The inner tube defines a connection passage which has a first opening and a second opening. The first opening communicates the first receiving room, and the second opening communicates the exit passage. The suction device provides the exit passage with a negative pressure. The first dust container defines a second receiving room therein. A mesh is disposed on a bottom surface of the first dust container to divide the second receiving room into a first chamber and a second chamber. The first chamber communicates the first receiving room. The bypass tube defines a bypass passage therein, and it communicates the connection passage with the second chamber. The first dust bag is disposed in the first chamber. The first dust bag defines a first bag chamber therein and has a bag opening communicating the first bag chamber with the first receiving room.

Whereby, the second chamber has a pressure lower than the first bag chamber. As such, the first dust bag will be sucked to attach to the mesh, expanding itself to receive more dust therein.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
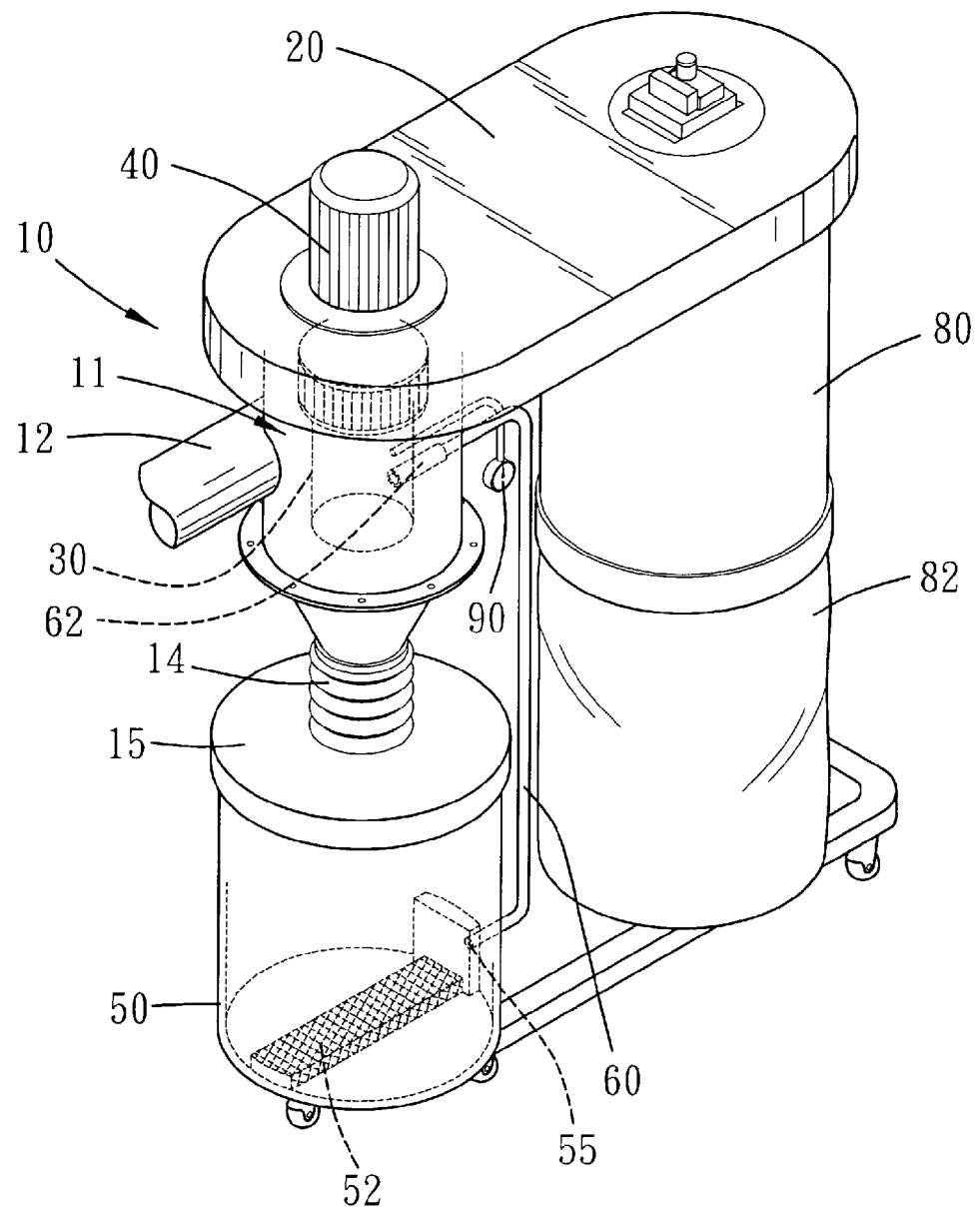
FIG. 1 is a perspective drawing showing a dust collector of the present invention.
Figure 2:
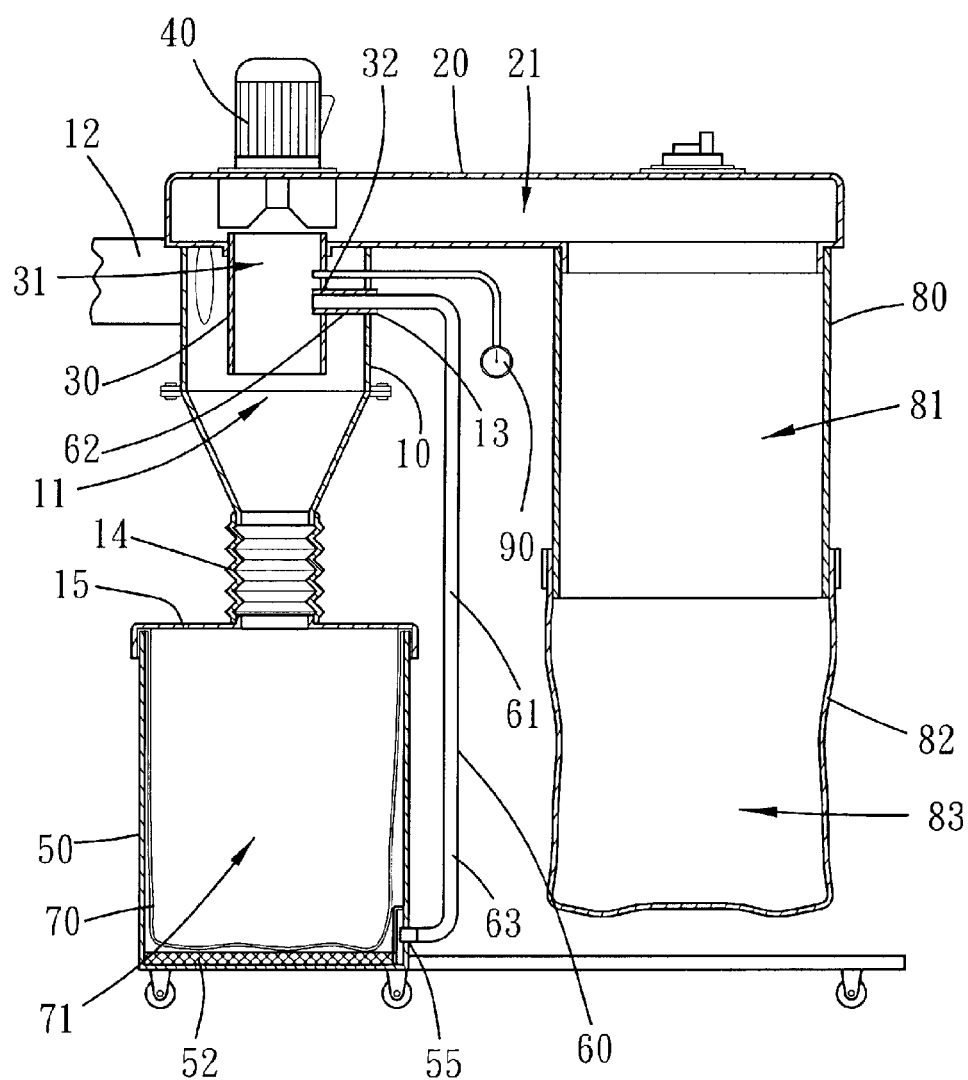
FIG. 2 is a profile showing a dust collector of the present invention.

Please refer to FIG. 1 and FIG. 2. The dust collector of the present invention is used to draw air therein, and the suspension dust will precipitate in the dust collector due to the pressure variation. The dust collector of the present invention includes a shell 10, an exit tube 20, an inner tube 30, a suction device 40, a first dust container 50, a bypass tube 60, a first dust bag 70, a second dust container 80 and a pressure gauge 90.

The shell 10 defines a first receiving room 11 therein, and the shell 10 has an entrance hole 12 communicating the first receiving room 11. More specifically, the entrance hole 12 is for the air to be drawn in the first receiving room 11 therefrom, and the shell 10 further has an upper opening, a lower opening and a shell bypass opening 13. A flexible tube 14 connects to the lower opening, and a cover 15 is disposed at a lower end of the flexible tube 14.

The exit tube 20 substantially envelops the upper opening of the shell 10, and the exit tube 20 defines an exit passage 21 therein.

The inner tube 30 extends from a periphery of the exit tube 20 toward the first receiving room 11. The inner tube 30 defines a connection passage 31 which has a first opening and a second opening. The first opening communicates the first receiving room 11, and the second opening communicates the exit passage 21. Furthermore, the inner tube 30 has a tube bypass opening 32 disposed between the first opening and the second opening. The pressure gauge 90 is disposed on the shell 10 to measure the pressure in the connection passage 31.

In the present embodiment, the suction device 40 is disposed on the exit tube 20 to provide a negative pressure to the exit passage 21. As such, the air drawn into the first receiving room 11, with the help of the suction device 40, is evacuated from the exit passage 21 via the connection passage 31.

The first dust container 50 defines a second receiving room 51 therein and has an upper opening, which is covered by the cover 15. A mesh 52 is disposed on a bottom surface of the first dust container 50 to divide the second receiving room 51 into a first chamber 53 and a second chamber 54. The first chamber 53 communicates the first receiving room 11 via the flexible tube 14. Moreover, the first dust container 50 further has a container bypass opening 55 communicating the second chamber 54. Preferably, the mesh 52 may have an inverted U-shaped cross section and both ends of the mesh 52 extend toward two opposite sides of the first dust container 50.

The bypass tube 60 defines a bypass passage 61 therein, and the bypass passage 61 communicates the connection passage 31 with the second chamber 54. More specifically, the bypass tube 60 includes a first tube section 62 and a second tube section 63. The first tube section 62 communicates the shell bypass opening 13 with the tube bypass opening 32, and the second tube section 63 is disposed out of the shell 10 and communicates the shell bypass opening 13 with the container bypass opening 55.

Figure 3:
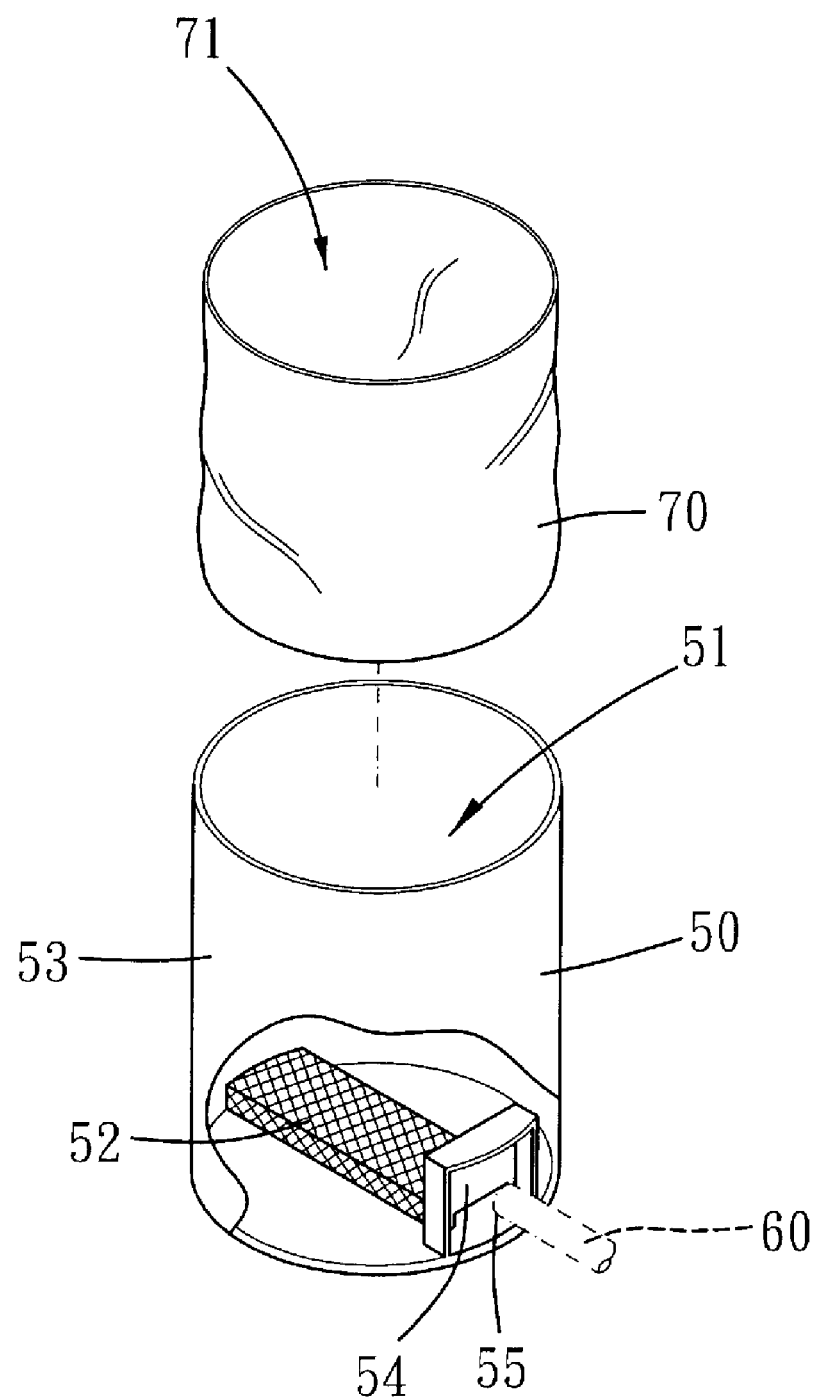
FIG. 3 is an explosive drawing showing a first dust container and a first dust bag of the present invention.

Please further refer to FIG. 3 along with the above mentioned Figures. The first dust bag 70 is disposed in the first chamber 53, and the first dust bag 70 defines a first bag chamber 71 therein and has a bag opening communicating the first bag chamber 71 with the first receiving room 11. As such, the bottom of the first dust bag 70 contacts the extendedly-disposed mesh 52 in a surface-contacting manner rather than a point-contacting manner.

The second dust container 80 is mainly tube-shaped and defines a third receiving room 81 communicating the exit passage 20. A second dust bag 82 is disposed on the second dust container 80 and defines a second bag chamber 83 communicating the third receiving room 81.

Figure 4:
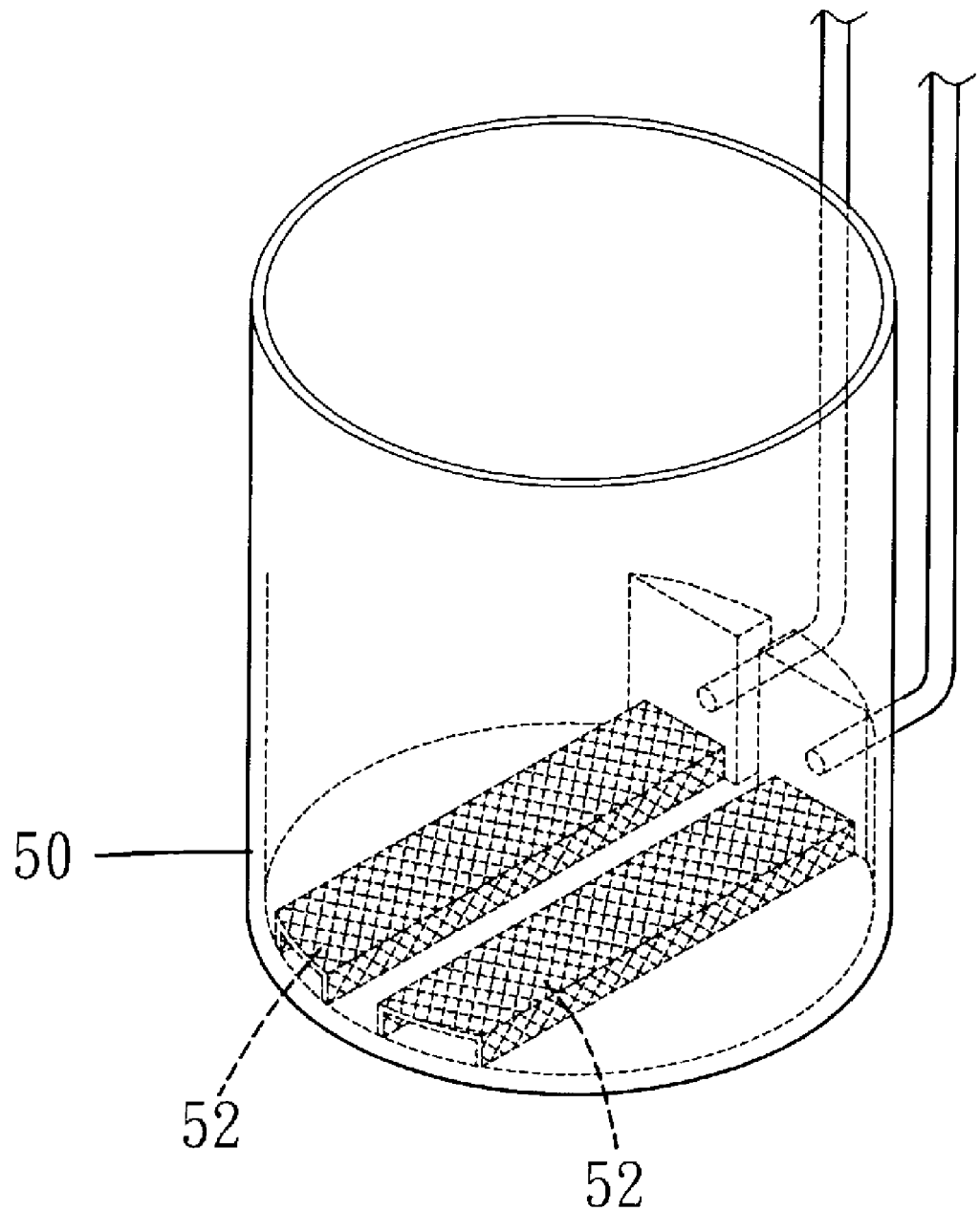
FIG. 4 is a drawing showing a first dust container in accordance with another preferred embodiment of the present invention.

Note that there may be more than one meshes 52 disposed in the first dust container 50 to provide more contacting surface to the first dust bag 70, as shown in FIG. 4. In yet another preferred embodiment of the present invention, the mesh may have a dimension substantially identical to the inner bore diameter of the first dust container so as to provide a contacting surface that is capable of contacting the entire bottom surface of the first dust bag.

Figure 5:
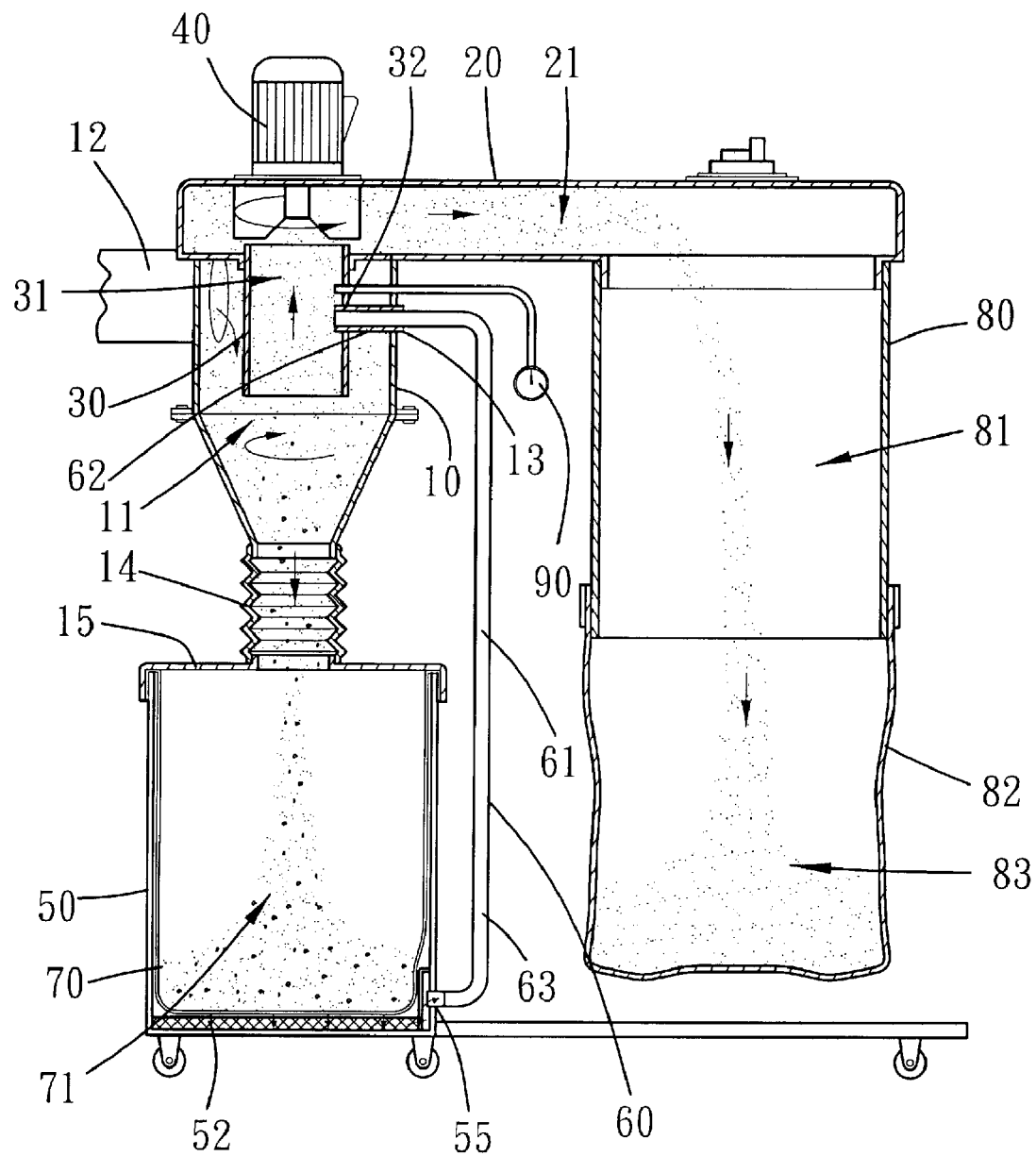
FIG. 5 is a profile showing a operation state of a dust collector of the present invention.

Please refer to FIG. 5. When the dust collector of the present invention is at use, the suction device 40 is activated and provides the negative pressure to the dust collector. As such, the air will be sucked into the first receiving room 11, and then flows into the exit passage 21 from the connection passage 31. The suspension dust in the air will fall into the first bag chamber 71 due to the variations of the pressure gradient, the air flowing rate and the air flowing direction. On the other hand, the pressure in the first receiving room 11 and the first bag chamber 71 is higher than that in the connection passage 31 since the first receiving room 11 communicates with the surrounding. Further, due to the bypass tube 60, the pressure in the second chamber 54 substantially equals to that in the connection passage 31. As such, a pressure drop is maintained between the second chamber 54 and the first bag chamber 71, sucking the first dust bag 70 against the extended-disposed mesh 52 tightly. Therefore, the first dust bag 70 is efficiently expanded for more dust to receive therein. Such design also prevents the first dust bag 70 from being sucked into the first receiving room 11 since the second chamber 54 provides stronger suction than the first receiving room 11 does. Moreover, even if the dust with lighter weight is sucked into the connection passage 31, it will still be gathered in the second dust bag 82 via the exit passage 21.

What is claimed is:

1. A dust collector, comprising
   a shell, defining a first receiving room therein, the shell having an entrance hole communicating the first receiving room;
   an exit tube, defining an exit passage therein;
   an inner tube, extending toward the first receiving room, the inner tube defining a connection passage which has a first opening and a second opening, the first opening communicating the first receiving room, the second opening communicating the exit passage;
   a suction device, providing the exit passage with a negative pressure;
   a first dust container, defining a second receiving room therein, a mesh being disposed on a bottom surface of the first dust container, the mesh dividing the second receiving room into a first chamber and a second chamber, the first chamber communicating the first receiving room;
   a bypass tube, defining a bypass passage therein, the bypass passage communicating the connection passage with the second chamber, and
   a first dust bag, disposed in the first chamber, the first dust bag defining a first bag chamber therein and having a bag opening communicating the first bag chamber with the first receiving room.

2. The dust collector of claim 1, wherein the shell has a shell bypass opening, the inner tube has a tube bypass opening disposed between the first opening and the second opening, the first dust container has a container bypass opening communicating the second chamber, the bypass tube comprises a first tube section and a second tube section, the first tube section communicates the shell bypass opening with the tube bypass opening, the second tube section communicates the shell bypass opening with the container bypass opening.

3. The dust collector of claim 1, wherein the mesh has an inverted U-shaped cross section, both ends of the mesh extend toward two opposite sides of the first dust container.

4. The dust collector of claim 1, further comprising a second dust container, defining a third receiving room communicating the exit passage, a second dust bag being disposed on the second dust container, the second dust bag defining a second bag chamber communicating the third receiving room.

5. The dust collector of claim 1, further comprising a pressure gauge for measuring the pressure in the connection passage.

* * * * *